Patented June 9, 1936

2,043,642

UNITED STATES PATENT OFFICE 2,043,642

BUILDING BRICK

George Witty, Long Island City, N. Y.

No Drawing. Application July 26, 1935,
Serial No. 34,247

2 Claims. (Cl. 106—24)

This invention relates to a process of and materials for the manufacture of brick without the necessity of burning in a kiln, as is necessary with clay products of such character.

A further object is to provide a mixture of materials and process by means of which brick may be produced in a variety of shapes which are impractical in clay products on account of cracking, chipping, warping and shrinking during the burning process.

Another object of this invention is to produce a brick made of a blast furnace slag, or other slag, so as to retain the characteristic of lightness accompanied, however, by strength superior to that of the burned clay brick.

In carrying out my process I use a mixture composed of ground blast furnace slag or other slags, hydraulic lime, calcium silico fluoride, calcium chloride, chrome alum, and pigments in the following proportions: ground blast furnace slag 150 parts, hydraulic lime 40 parts, calcium silico fluoride 6 parts, calcium chloride 3 parts, chrome alum 1 part, pigments 7 parts. Thoroughly mixed in dry state and sufficient water added to form a moistened mass, and pressed into brick tile and the like. After the brick are pressed, they will be placed in a curing tunnel or chamber and treated under steam and moisture at a temperature not less than 75° C. and not over 100° C. for a period of four hours.

Bricks thus made of my compound improve with age and have great crushing strength while being light in weight and low in absorption. Furthermore, these bricks provide a better bond with mortar, and when so used or exposed to the weather do not scale, crack or disintegrate under extreme atmospheric changes.

While I have specially referred to the product as bricks, the plastic mass obtained from the mixing process may be employed also for the manufacture of hollow tile and partition blocks.

It will be observed that, although certain specific materials are set forth, the invention is not necessarily limited thereto, but includes other proportions and other materials having similar properties and characteristics.

Having now described my invention, what I claim as new and useful is:

1. A blast furnace slag brick consisting of ground blast furnace slag, hydraulic lime, calcium silico fluoride, calcium chloride, chrome alum and pigments.

2. A blast furnace slag brick consisting of ground blast furnace slag 150 parts, hydraulic lime 40 parts, calcium silico fluoride 6 parts, calcium chloride 3 parts, chrome alum 1 part and pigments 7 parts.

GEORGE WITTY.